(12) United States Patent
Allen, Jr. et al.

(10) Patent No.: US 7,657,771 B2
(45) Date of Patent: Feb. 2, 2010

(54) METHOD AND APPARATUS FOR REDUCING LATENCY ASSOCIATED WITH READ OPERATIONS IN A MEMORY SYSTEM

(75) Inventors: James J. Allen, Jr., Raleigh, NC (US);
Steven K. Jenkins, Raleigh, NC (US);
James A. Mossman, Raleigh, NC (US);
Michael R. Trombley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 11/621,201

(22) Filed: Jan. 9, 2007

(65) Prior Publication Data

US 2008/0168293 A1 Jul. 10, 2008

(51) Int. Cl.
*G06F 1/04* (2006.01)
*G06F 13/00* (2006.01)

(52) U.S. Cl. ............ 713/401; 713/503; 711/167
(58) Field of Classification Search .......... 713/400, 713/401, 503; 711/167, 168, 169
See application file for complete search history.

(56) References Cited

U.S. PATENT DOCUMENTS

| | | | |
|---|---|---|---|
| 5,652,856 A | * | 7/1997 | Santeler et al. ............ 711/105 |
| 6,161,160 A | | 12/2000 | Niu et al. |
| 6,594,748 B1 | | 7/2003 | Lin |
| 2004/0103258 A1 | * | 5/2004 | Blackmon et al. .......... 711/167 |
| 2006/0230215 A1 | | 10/2006 | Woodral |
| 2008/0209095 A1 | * | 8/2008 | Allen et al. ................ 710/118 |

FOREIGN PATENT DOCUMENTS

EP 0574598 A1 12/1993

OTHER PUBLICATIONS

PCT Notification of Transmittal of the International Search Report and the Written Opinion of the International Searching Authority, or the Declaration, Mar. 25, 2008, 10 pages.

* cited by examiner

*Primary Examiner*—Dennis M Butler
(74) *Attorney, Agent, or Firm*—Yee & Associates, P.C.; Mark E. McBurney (57) ABSTRACT

Methods and system for reducing latency associated with a read operation in a processor memory system are provided. In one implementation, the method includes receiving an early indicator corresponding to read data from a memory, delaying the early indicator in accordance with a pre-determined delay such that the early read indicator is passed to a bus in advance of the read data; and dynamically adjusting the pre-determined delay using an adjustment delay circuit, the pre-determined delay being adjusted responsive to a change in operational speed of the bus or change in operational speed of a processor coupled to the bus.

19 Claims, 5 Drawing Sheets

METHOD AND APPARATUS FOR REDUCING LATENCY ASSOCIATED WITH READ OPERATIONS IN A MEMORY SYSTEM

FIELD OF THE INVENTION

The present invention relates generally to processing systems and circuits, and more particularly to reducing latency for read operations in a memory system.

BACKGROUND OF THE INVENTION

Figure 1:
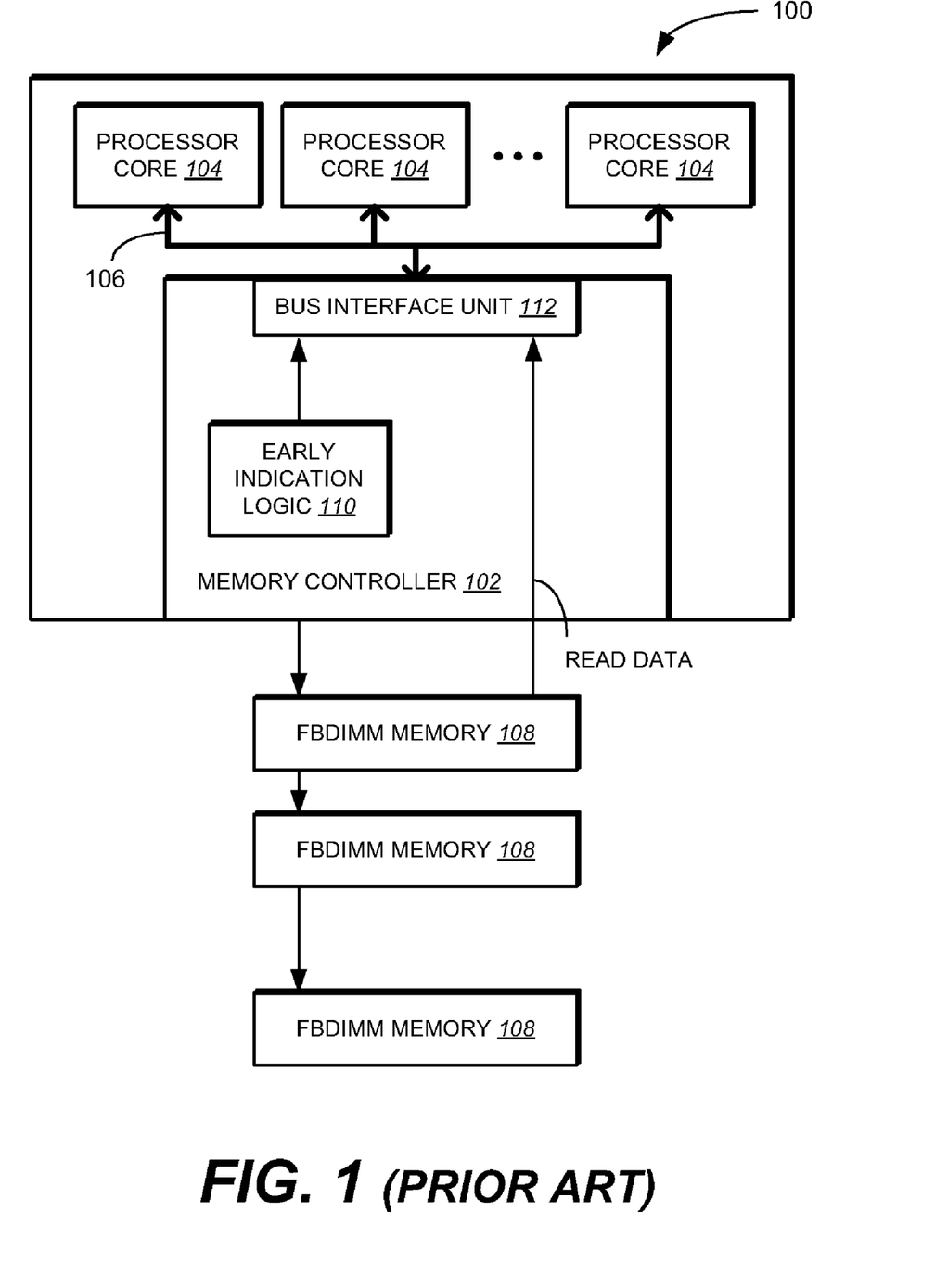
FIG. 1 is a block diagram of a conventional memory system.

FIG. 1 illustrates a conventional processor memory system 100 including a memory controller 102 coupled to a plurality of processors 104 through an internal bus 106. The memory system 100 further includes a plurality of memory modules 108 (e.g., fully buffered dual in-line memory modules (FB-DIMMs) that are in communication with the memory controller 102. In conventional processor memory systems, the latency for returned data (from a memory module) with respect to read operations is critical to the performance of attached processors. To help reduce this latency, the memory controller 102 includes early indication logic 110 that provides early information about the returning read data to a bus interface unit 112 in advance of the actual read data. Providing the early information in advance of the actual read data permits some pre-processing (e.g., buffer management, lookups, arbitration, and so on) associated with the read data to take place in the bus interface unit 112 and/or the internal bus 106. The early information (referred to herein as "early read indicators") provided by the early indication logic 110 can include, e.g., a target buffer, a cache line position, or any special tagging or flags. Pre-processing of early read indicators permits the read data (upon arrival) to be passed to the internal bus 106 in a more time efficient manner.

Figure 2:
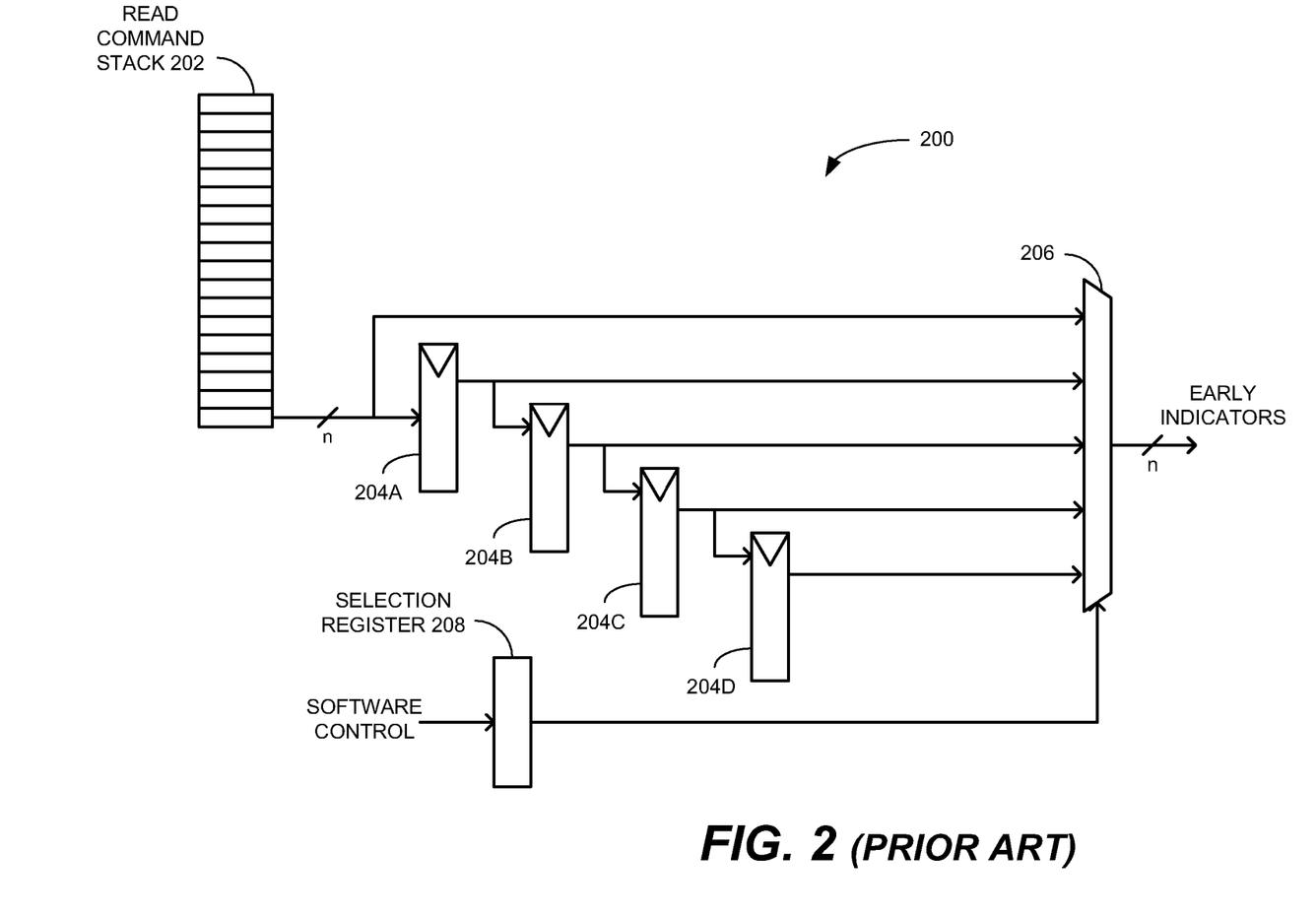
FIG. 2 is a block diagram of a conventional pipelined-based adjustable delay circuit.
Figure 3:
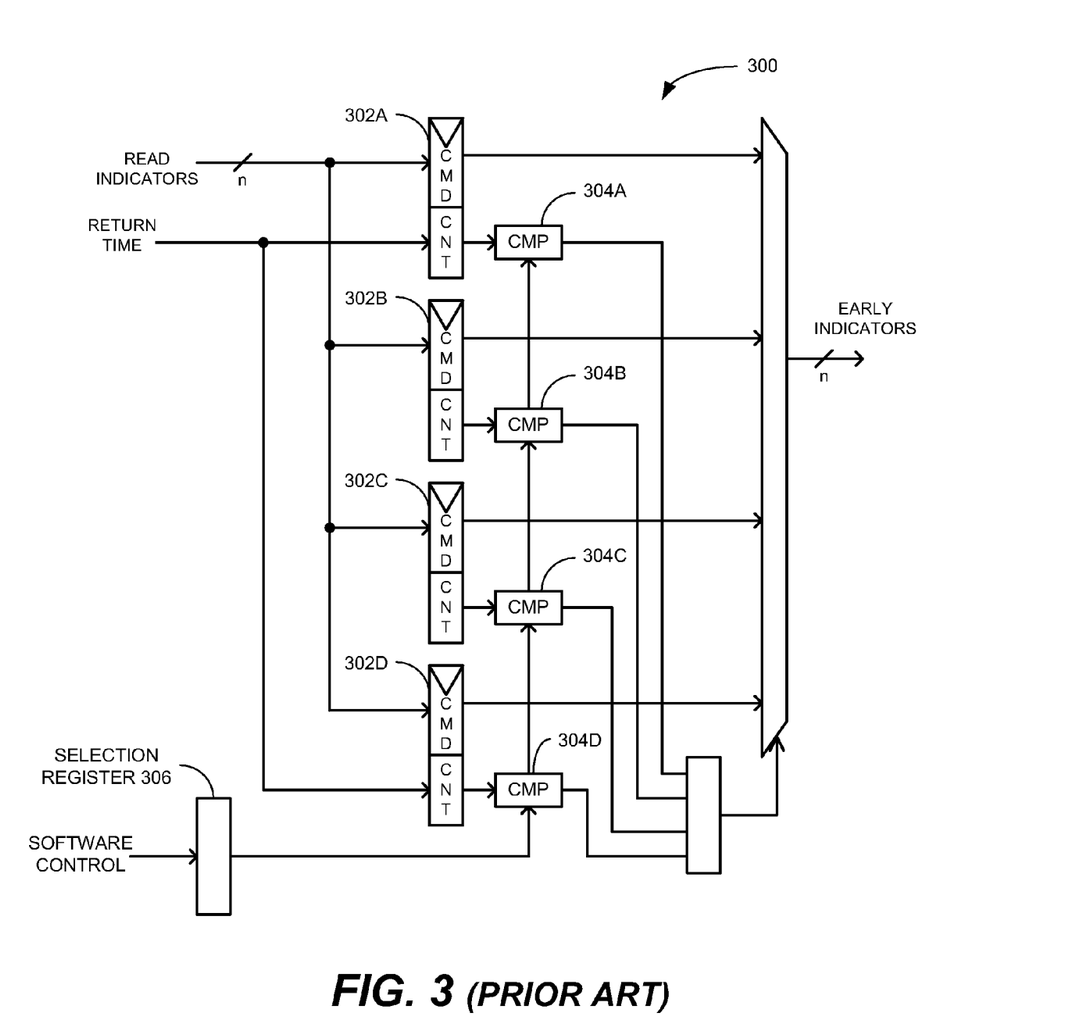
FIG. 3 is a block diagram of a conventional non-pipelined-based adjustable delay circuit.

In a memory controller, early read indicators are typically known well in advance of the returning read data, usually when a read command is issued to a memory module. To time-align early read indicators ahead of corresponding read data, conventional memory controllers typically includes an adjustable delay circuit. FIG. 2 illustrates a conventional pipeline-based adjustable delay circuit 200. In operation, the adjustable delay circuit 200 retrieves early read indicators from a read command stack 202 (or FIFO) several (clock) cycles before corresponding read data is to be returned. The early read indicators pass through a series of staged latches 204A-204D, with each latch 204A-204D feeding into a single multiplexer 206 that is controlled by a selection register 208. Controlling software writes the selection register 208 with a known value, which will select the proper staged latch that matches a desired delay. For example, if the early read indicators are selected from the latch 204D, the early read indicators will arrive coincident with the read data. If the early read indicators are pulled from the latch 204A, the early read indicators will arrive three clock cycles ahead of corresponding read data. FIG. 3 illustrates a conventional non-pipelined-based adjustable delay circuit 300. As shown in FIG. 3, early read indicators as well as a count (or return time) is stored into registers 302A-302D. The count is the time until the read data is returned—thus, the count decrements with each clock cycle, and when the count reaches zero, the read data is available. Comparators 304A-304D respectively compares the count stored in registers 302A-302D with a count stored in a selection register 306. Once the count stored in one of registers 302A-302D is less than the count stored in the selection register 304, the early read indicators are selected by a multiplexer 308 and passed forward, e.g., to a bus interface unit (not shown).

Conventional adjustable delay circuits as shown in FIGS. 2 and 3 are suitable for processor systems that contain a single clock domain. However, more complex memory systems are being developed that require memory controllers to interface with memories having different speed offerings, as well as interface with different processor and bus speeds. In such memory systems, the memory controller, the internal bus, and the processor (or processors) could all be operating in different clock domains at different speeds. In these memory systems, conventional techniques for providing an adjustable delay of early read indicators in which control software sets (or writes) a selection register does not work well. Such conventional techniques do not provide the needed ability to make dynamic updates. Furthermore, if the control software was used to make updates to a selection register, such a process could take considerable time and adversely affect performance of a memory system.

BRIEF SUMMARY OF THE INVENTION

In general, in one aspect, this specification describes a processor memory system including a processor a memory controller in communication with the processor through a bus. The memory controller includes a delay circuit to receive an early read indicator corresponding to read data from a memory. The delay circuit delays the early read indicator in accordance with a pre-determined delay such that the early read indicator is passed to the bus in advance of the read data. The memory controller further includes a delay adjustment circuit to dynamically adjust the pre-determined delay associated with the delay circuit responsive to a change in operational speed of the processor or the bus.

Particular implementations can include one or more of the following features. The delay adjustment circuit can operate in one of a manual mode, an automatic mode, or a speed up mode, in which the speed up mode is a mode of operation that is useable responsive to the processor or the bus leaving a low power state. The delay circuit can include a read command stack from which the early read indicator is obtained; a plurality of staged latches in communication with the read command stack, in which each staged latch to delay the early read indicator by a different amount; a multiplexer coupled to an output of each of the plurality of staged latches; and a control latch to store a plurality of values for selecting the early read indicator from an output of a given staged latch through the multiplexer. The delay adjustment circuit can include a first state machine to dynamically update the plurality of values stored in the control latch responsive to a control input. Responsive to the delay adjustment circuit operating in the automatic mode, the control input into the first state machine can be derived from a comparison between a given value stored in the control latch and a corresponding desired delay value stored in a second latch. The delay adjustment circuit can further include a third latch to store a margin value that can be subtracted from the desired delay value stored in the second latch. Responsive to the delay adjustment circuit operating in the manual mode, the control input into the first state machine can be derived from a comparison between a given value stored in the control latch and a corresponding value stored in the third latch.

Particular implementations can further include one or more of the following features. The delay adjustment circuit can further include a second state machine to update the desired delay value stored in the second latch at regular intervals in accordance with a sync command signal, in which the sync command signal is a signal associated with the memory. The memory can comprise a fully buffered dual in-line memory module (FBDIMM). The second state machine can measure a bus interface sense signal to determine a time by which the early read indicator should arrive at the bus in advance of the read data. Responsive to the delay adjustment circuit operating in the manual mode, the control input into the first state machine can be derived from a comparison between a given value stored in the control latch and a corresponding value stored in the third latch. The delay circuit and the delay adjustment circuit can operate according to a first clock domain, while the processor and the bus operates according to a second clock domain that is different from the first clock domain.

In general, in another aspect, this specification describes a method for reducing latency associated with a read operation in a processor memory system. The method includes receiving an early indicator corresponding to read data from a memory; delaying the early indicator in accordance with a pre-determined delay such that the early read indicator is passed to a bus in advance of the read data; and dynamically adjusting the pre-determined delay using an adjustment delay circuit, the pre-determined delay being adjusted responsive to a change in operational speed of the bus or change in operational speed of a processor coupled to the bus.

Particular implementations can include one or more of the following features. Receiving an early indicator can include receiving one of a target buffer, a cache line position, a tag, or flag. The change in operational speed of the bus or change in operational speed of a processor coupled to the bus can be sensed from an asynchronous signal. The delay adjustment circuit can operate in one of a manual mode, an automatic mode, or a speed up mode, in which the speed up mode is a mode of operation that is useable responsive to the processor or the bus leaving a low power state. The method can further include disabling the automatic mode of operation of the delay adjustment circuit responsive to the processor or the bus leaving a low power state, and resetting a lead time for the early indicator substantially to zero. The method can further include extending the lead time for the early indicator until a desired new lead time is reached. Receiving an early indicator can include receiving an early indicator from a read command stack. The method can further include further delaying the early read indicator by reading the early read indicator from an earlier point in read command stack.

Implementations can provide one or more of the following advantages. In one aspect, this specification describes techniques for automatic, manual, and speed up methods for dynamically adjusting the delay values (or predetermined delays) for early read indicators. In an automatic mode, the early indicators are adjusted (in one implementation) based on the performance of an internal bus buffering and arbitration scheme. For example, as the internal bus and processors increase or decrease in speed, the delay associated with the early read indicators can be adjusted accordingly so that corresponding read data will be passed to the internal bus in the most efficient manner. In addition, the speed up method provides the ability to make very fast changes to the delay values when one or more associated processors are returning from a power saving mode. The techniques described herein also permit a wider range of delay values to be used relative to conventional techniques.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to processing systems and circuits, and more particularly to reducing latency for read operations in a processor memory system. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 4:
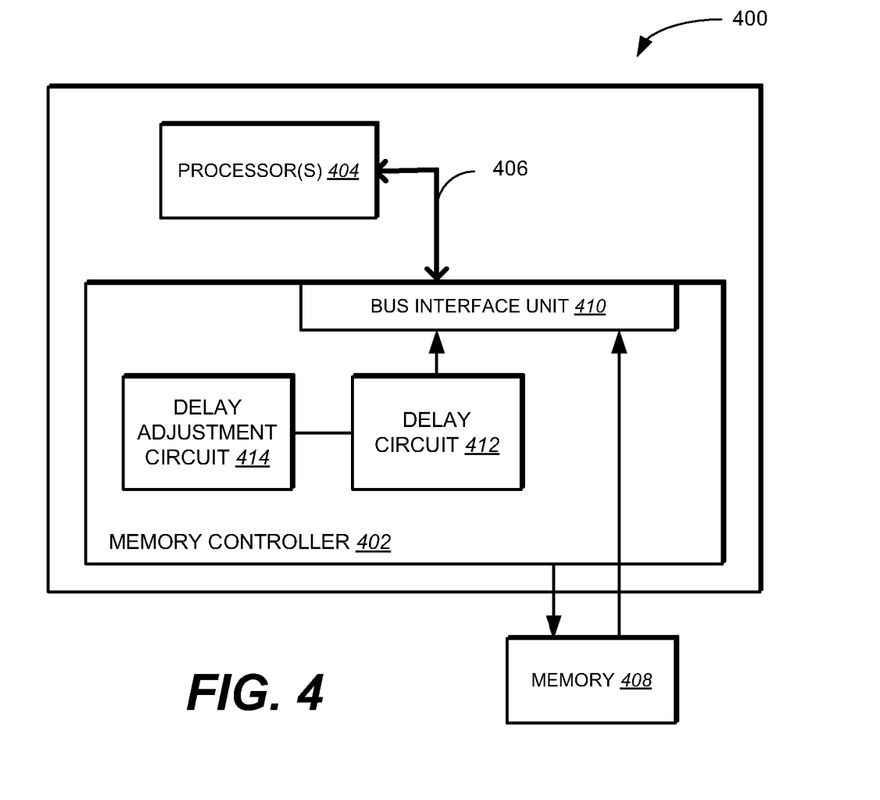
FIG. 4 is a block diagram of a memory system in accordance with one implementation.

FIG. 4 illustrates a processor memory system 400 in accordance with one implementation of the invention. The processor memory system 400 includes a memory controller 402 in communication with one or more processors 404 through an internal bus 406. The memory controller 402 is also coupled to a memory 408 from which data is written to and read from in accordance with instructions processed by the processor(s) 404. Although a single memory module is shown coupled to the memory controller 402, the memory controller can be coupled to any number of memory modules. The memory 408 can be any type of memory operable to store data—e.g., a single in-line memory module (SIMM), a dual in-line memory module (DIMM), and the like. In one implementation, the memory 408 is a data cache that is part of an L1 cache or an L2 cache. In one implementation, data from a processor read operation (referred to herein as "read data") is provided from the memory 408 to a bus interface unit 410 associated with the memory module 402. The read operation can be associated with a load operation from the processor in which data from the memory 408 is transferred to the processor(s) 404.

The memory controller 402 includes a delay circuit 412 that provides early indicators to the bus interface to reduce latency associated with processor read operations. Accordingly, in one implementation, the delay circuit 412 receives early read indicators (e.g., from a read command stack) corresponding to read data and delays the early read indicators in accordance with a pre-determined delay such that the early read indicators are passed to the bus interface unit 410 (and the bus 406) prior to the read data at a pre-determined time. The pre-determined time can be one or more clock cycles as required by application requirements. The early read indicators can include a target buffer, a cache line position, any special tagging or flags, or other data used in pre-processing of read data.

Unlike conventional memory controllers, the memory controller 402 further includes (in one implementation) a delay adjustment circuit 414 operable to dynamically adjust the pre-determined delay (or the delay values) of the delay circuit 412. In one implementation, the delay adjustment circuit 414 and the delay circuit 412 operate in a first clock domain (e.g., according to the same clock), and the delay adjustment circuit 414 is operable to adjust the pre-determined delay of the delay circuit 412 responsive to an asynchronous signal (e.g., a signal operating in a second clock domain that is different from the first clock domain). For example, in such an implementation, the delay adjustment circuit 414 can adjust the predetermined delay of the delay circuit 412 responsive to a sensed change in operational speed of the bus 406 and/or the processor(s) 404.

Figure 5:
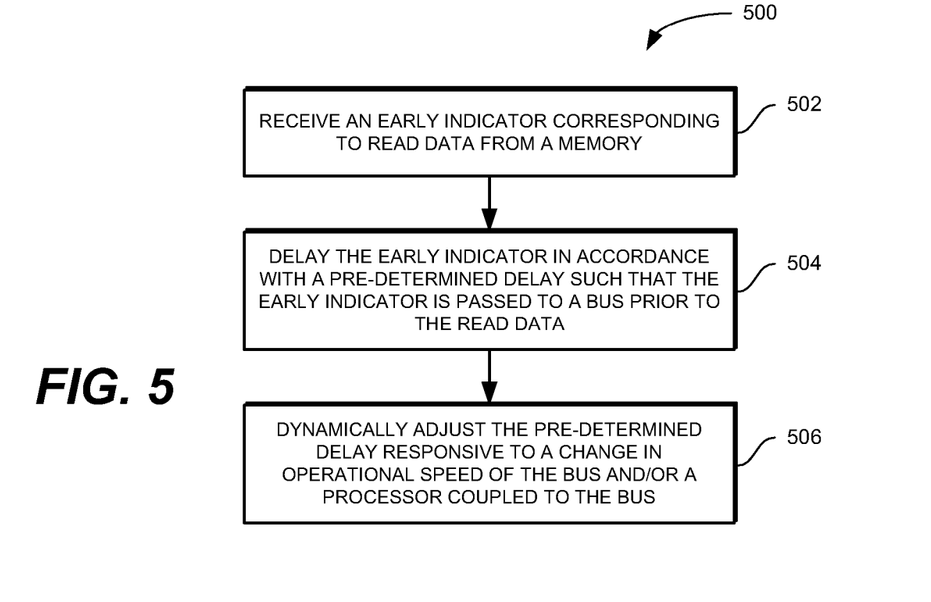
FIG. 5 is a flow diagram of a method for reducing latency associated with a read operation in accordance with one implementation.

FIG. 5 illustrates a method 500 for reducing latency associated with a read operation in accordance with one implementation. An early read indicator is received (e.g., by the delay circuit 412) that corresponds to read data from a memory (e.g., memory 408) (step 502). As discussed above, the early indicator corresponds to data used in pre-processing of the read data—e.g., a target buffer, a cache line position, any special tagging or flags, and the like. The early read indicator is delayed (e.g., by the delay circuit 412) in accordance with a pre-determined delay such that the early read indicator is passed to a bus (e.g., bus 406) prior to the read data (step 504). The early read indicator can be passed to the bus through a bus interface unit (e.g., bus interface unit 410). The pre-determined delay (associated with the delay circuit 412) is dynamically adjusted, e.g., responsive to a change in operational speed of the bus and/or a processor coupled to the bus (step 506). More generally, the pre-determined delay can be adjusted responsive to any synchronous or asynchronous control signal. The pre-determined delay can be adjusted automatically or manually as discussed in greater detail below.

Figure 6:
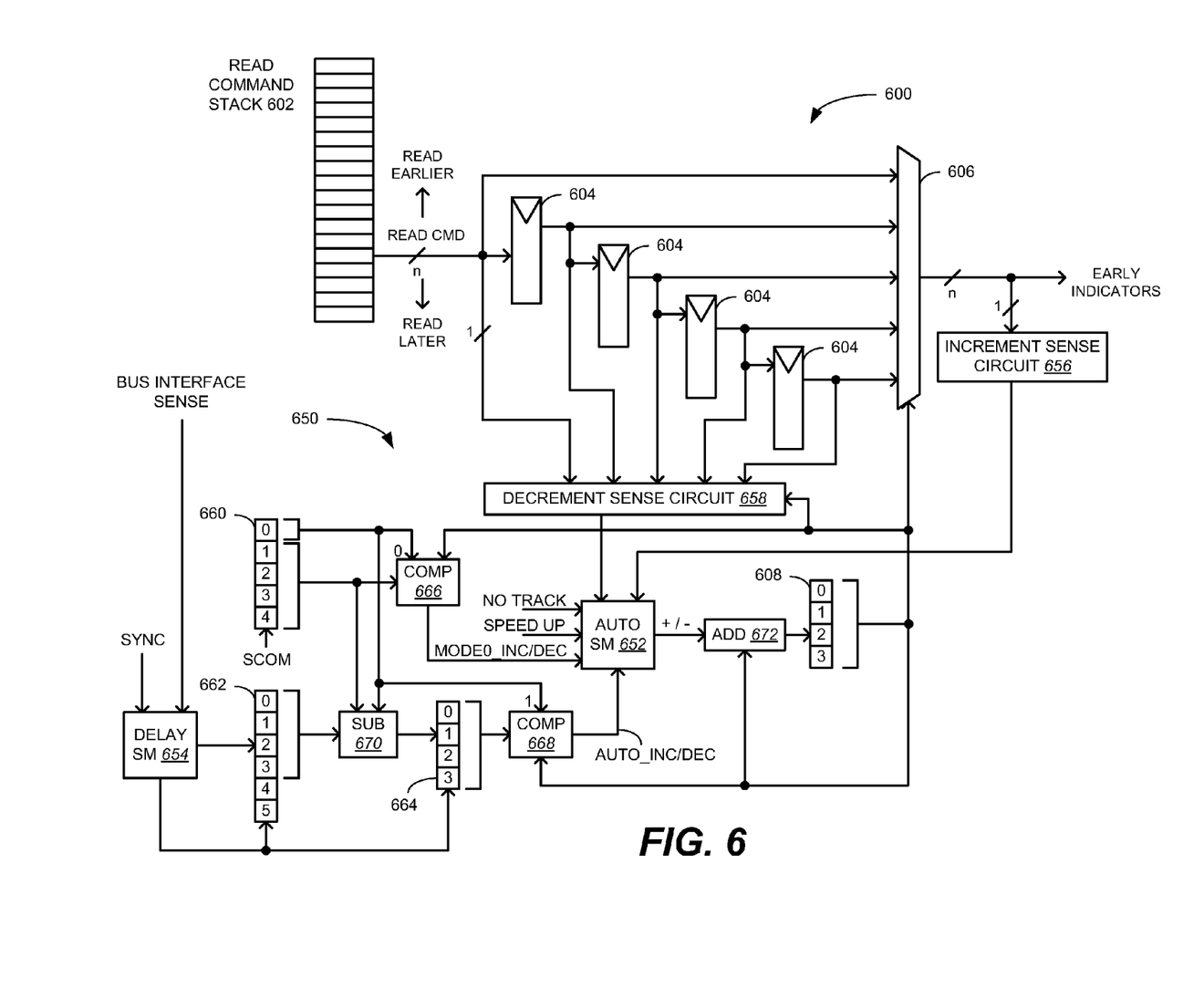
FIG. 6 illustrates a block diagram of a delay circuit and a delay adjustment circuit in accordance with one implementation.

FIG. 6 illustrates a block diagram of a delay circuit 600 and a delay adjustment circuit 650 in accordance with one implementation. The delay circuit 600 includes a read command stack 602, a plurality of staged latches 604, a multiplexer 606, and a control latch 608. The delay adjustment circuit 650 includes an auto state machine (SM) 652, a second (delay) state machine 654, an increment sense circuit 656, a decrement sense circuit 658, latches 660-664, comparators 666-668, a subtractor 670, and an adder 672.

In one implementation, the delay circuit 600 is based on a similar pipeline structure as described above with respect to a conventional delay circuit (e.g., the adjustable delay circuit 200). However, rather than being controlled by a simple selection register, the multiplexer 606 is controlled by the control latch 608. In one implementation, the control latch 608 is a 4-bit latch, in which delay values stored in the control latch 608 are dynamically updated by the auto machine 652. In one implementation, the auto state machine 652 only increments or decrements a delay value stored in the control latch 608 by one for each input request received by the auto state machine 652. In one implementation, the auto state machine 652 receives an input from one of three different types of control sources—automatic mode control signals (auto_inc/dec), manual mode control signals (mode0_inc/dec), or speed up/no track control signals (NoTrack/SpeedUp). These control sources can cause multiple increments or decrements to one or more values stored in the control latch 608 by the control sources remaining active, as discussed in greater detail below. In one implementation, due to the pipeline flow of the read indicators through the staged latches 604, adjustments to the multiplexer 606 can only occur at set times (e.g., when the current entry or previous entry is empty) to prevent the replication or loss of early read indicators. For both increments and decrements, a sense circuit (e.g., the increment sense circuit 656 and the decrement sense circuit 658) checks for these empty entries and provides corresponding inputs to the auto state machine 652. In general, read indicators will not always occur back to back. Therefore, in one implementation, each entry carries a valid flag to indicate that the entry carries a valid read indicator. As discussed above, the multiplexer 606 needs to be switched carefully because a hazard exist that could cause the read indicator to either be lost or duplicated. In one implementation, the increment and decrement sense logic looks at these valid flags and the current multiplexer selection to determine when this hazard window is not present.

Automatic Mode

The automatic mode control signals (auto_inc) and (auto_dec) are input control signals to the auto state machine 652 that respectively request an increment and a decrement to delay values stored in the control latch 608. The automatic mode control signals (auto_inc) and (auto_dec) are based on a comparison (by the comparator 668) between delay values stored in the control latch 608 (current delay values) and corresponding values stored in the latch 664 (desired delay values). When there is a difference between corresponding desired delay values (stored in the latch 664) and current delay values (stored in the control latch 608) and the automatic mode is enabled, then an increment or decrement request is sent to the auto state machine 652.

In one implementation, the desired delay values stored in the latch 664 are updated with new desired delay values at regular intervals based in a sense signal (bus interface sense signal) from bus interface logic (not shown). In one implementation, the bus interface signal is an asynchronous indication from the bus interface logic, and represents how early the read indicators are needed. The bus interface signal can be derived from known fixed delays in the memory controller bus interface logic in addition to known fixed delays on the internal bus (such as the arbitration delay). In one implementation, the bus interface sense signal operates in accordance with the bus interface clock domain and is double latched for metastability. In one implementation, the bus interface signal toggles at a rate that is equal to the desired lead time for the early read indicators to precede corresponding read data at the bus interface unit.

The delay state machine 654 is responsible for updating the desired delay values stored in the latch 664 with new values, and, in one implementation, the desired delay are updated at regular intervals. For example, in a processor memory system including FBDIMMs, a sync command can be used to establish a regular update interval of every 42 frames or 126 clocks. Other suitable time update intervals can be used. An update interval of 42 frames is an arbitrary interval selected to reduce power over a continuous adjustment. Thus, with each sync command, the delay state machine 654 measures the length of the bus interface sense signal. For increased accuracy, in one implementation, the delay state machine 654 measures two complete periods of the bus interface sense signal, and the result is divided by four to generate a new desired delay value, which value is then loaded into the latch 664. Additional margin can be added to the new desired delay value by subtracting clock cycles to the new desired delay value. As shown in FIG. 6, the margin value can be retrieved from a latch 660 when the delay adjustment circuit 650 is operating in the automatic mode.

Manual Mode

The control signals (mode0_inc) and (mode0_dec) are generated with the delay adjustment circuit 650 is operating in the manual mode. In one implementation, the control signals (mode0_inc) and (mode0_dec) are generated when a desired delay value has been written into the latch 660, and the desired delay value is different (as determined by the comparator 666) than a corresponding current delay value stored in the control latch 608. Note: the latch 660 is used for two different purposes dependent upon the mode of operation of the delay adjustment circuit 650—in the manual mode, the latch 660 stores a desired delay value, while in the automatic mode (as discussed above), the latch 660 stores the number of clocks to be used as a margin. Re-usage of the same latch to perform different tasks among different modes of operation permits the circuitry of the adjustment delay circuit to be implemented in a smaller area.

No Track and Speed Up

The speed up/no track control signals (NoTrack/SpeedUp) are used when the processor(s) of the processor memory system are leaving a low power state. For example, when entering a low power state, the processor(s) (e.g., processor(s) 404) and/or the internal bus (e.g., internal bus 406) are typically slowed down significantly relative to a normal operational speed. The delay adjustment circuit 650 can track the lower operational speed of the processor(s) and/or the internal bus (in the automatic mode of operation) and, accordingly, update the current delay values stored in the control latch 608 with a maximum delay value. Upon leaving the low power state, however, the delay adjustment circuit 650 may not be able to track the speed of the processor(s) and/or the internal bus while operating in the automatic mode of operation. That is, if the ramp up speed of the processor(s) and the bus is slow enough, the delay adjustment circuit 650 will be able to track the speed of the processor(s) and the bus and maintain correct delay values between early read indicators and corresponding read data. However, if the ramp up speed of the processor(s) and the bus is too fast, (in one implementation) the automatic mode of operation of the delay adjustment circuit 650 is disabled and the lead time of any early read indicators is reset substantially to zero (e.g., coincident to the read data). In the implementation shown in FIG. 6, the automatic mode of operation of the delay adjustment circuit 650 is disabled by the (NoTrack) signal, and the (SpeedUp) signal is toggled to reduce the delay values stored in the control latch 608 by one until the desired lead time is reached.

Various implementations for reducing latency for read operations in a processor memory system have been described. Nevertheless, various modifications may be made to the implementations described above, and those modifications would be within the scope of the present invention. For example, as shown in FIG. 6, a greater delay value can be obtained by reading early read indicators from the read command stack 602 at different locations within the stack. Thus, in one implementation, if early read indicators are read earlier from the read command stack 602, an additional delay of 3 clock cycles can be obtained. In addition, although the above techniques shown in FIG. 6 are described in accordance with a delay circuit including a pipeline structure, the techniques can be applied to delay circuits having a non-pipeline structure. Accordingly, many modifications may be made without departing from the scope of the present invention.

What is claimed is:

1. A processor memory system comprising:
a processor; and
a memory controller in communication with the processor through a bus, the memory controller including,
a delay circuit to receive an early read indicator corresponding to read data from a memory, the delay circuit to delay the early read indicator in accordance with a pre-determined delay such that the early read indicator is passed to the bus in advance of the read data; and
a delay adjustment circuit to dynamically adjust the pre-determined delay associated with the delay circuit responsive to a change in operational speed of the processor or the bus.

2. The processor memory system of claim 1, wherein the delay adjustment circuit operates in one of a manual mode, an automatic mode, or a speed up mode, the speed up mode being a mode of operation that is useable responsive to the processor or the bus leaving a low power state.

3. The processor memory system of claim 2, wherein the delay circuit comprises:
a read command stack from which the early read indicator is obtained;
a plurality of staged latches in communication with the read command stack, each staged latch to delay the early read indicator by a different amount;
a multiplexer coupled to an output of each of the plurality of staged latches; and
a control latch to store a plurality of values for selecting the early read indicator from an output of a given staged latch through the multiplexer.

4. The processor memory system of claim 3, wherein the delay adjustment circuit includes a first state machine to dynamically update the plurality of values stored in the control latch responsive to a control input.

5. The processor memory system of claim 4, wherein responsive to the delay adjustment circuit operating in the automatic mode, the control input into the first state machine is derived from a comparison between a given value stored in the control latch and a corresponding desired delay value stored in a second latch.

6. The processor memory system of claim 5, wherein the delay adjustment circuit further includes a third latch to store a margin value that can be subtracted from the desired delay value stored in the second latch.

7. The processor memory system of claim 6, wherein responsive to the delay adjustment circuit operating in the manual mode, the control input into the first state machine is derived from a comparison between a given value stored in the control latch and a corresponding value stored in the third latch.

8. The processor memory system of claim 5, wherein the delay adjustment circuit further includes a second state machine to update the desired delay value stored in the second latch at regular intervals in accordance with a sync command signal, the sync command signal being a signal associated with the memory.

9. The processor memory system of claim 8, wherein the memory comprises a fully buffered dual in-line memory module (FBDIMM).

10. The processor memory system of claim 8, wherein the second state machine measures a bus interface sense signal to determine a time by which the early read indicator should arrive at the bus in advance of the read data.

11. The processor memory system of claim 6, wherein responsive to the delay adjustment circuit operating in the manual mode, the control input into the first state machine is derived from a comparison between a given value stored in the control latch and a corresponding value stored in the third latch.

12. The processor memory system of claim 1, wherein:
the delay circuit and the delay adjustment circuit operate according to a first clock domain; and the processor and the bus operate according to a second clock domain that is different from the first clock domain.

13. A method for reducing latency associated with a read operation in a processor memory system, the method comprising:
receiving an early indicator corresponding to read data from a memory;
delaying the early indicator in accordance with a pre-determined delay such that the early read indicator is passed to a bus in advance of the read data; and
dynamically adjusting the pre-determined delay using an adjustment delay circuit, the pre-determined delay being adjusted responsive to a change in operational speed of the bus or change in operational speed of a processor coupled to the bus.

14. The method of claim 13, wherein receiving an early indicator includes receiving one of a target buffer, a cache line position, a tag, or flag.

15. The method of claim 13, wherein the change in operational speed of the bus or change in operational speed of a processor coupled to the bus is sensed from an asynchronous signal.

16. The method of claim 13, wherein the delay adjustment circuit operates in one of a manual mode, an automatic mode, or a speed up mode, the speed up mode being a mode of operation that is useable responsive to the processor or the bus leaving a low power state.

17. The method of claim 16, further comprising:
disabling the automatic mode of operation of the delay adjustment circuit responsive to the processor or the bus leaving a low power state; and
resetting a lead time for the early indicator substantially to zero.

18. The method of claim 17, further comprising extending the lead time for the early indicator until a desired new lead time is reached.

19. The method of claim 13, wherein:
receiving an early indicator includes receiving an early indicator from a read command stack; and
the method further includes further delaying the early read indicator by reading the early read indicator from an earlier point in read command stack.

* * * * *